Patented June 20, 1950

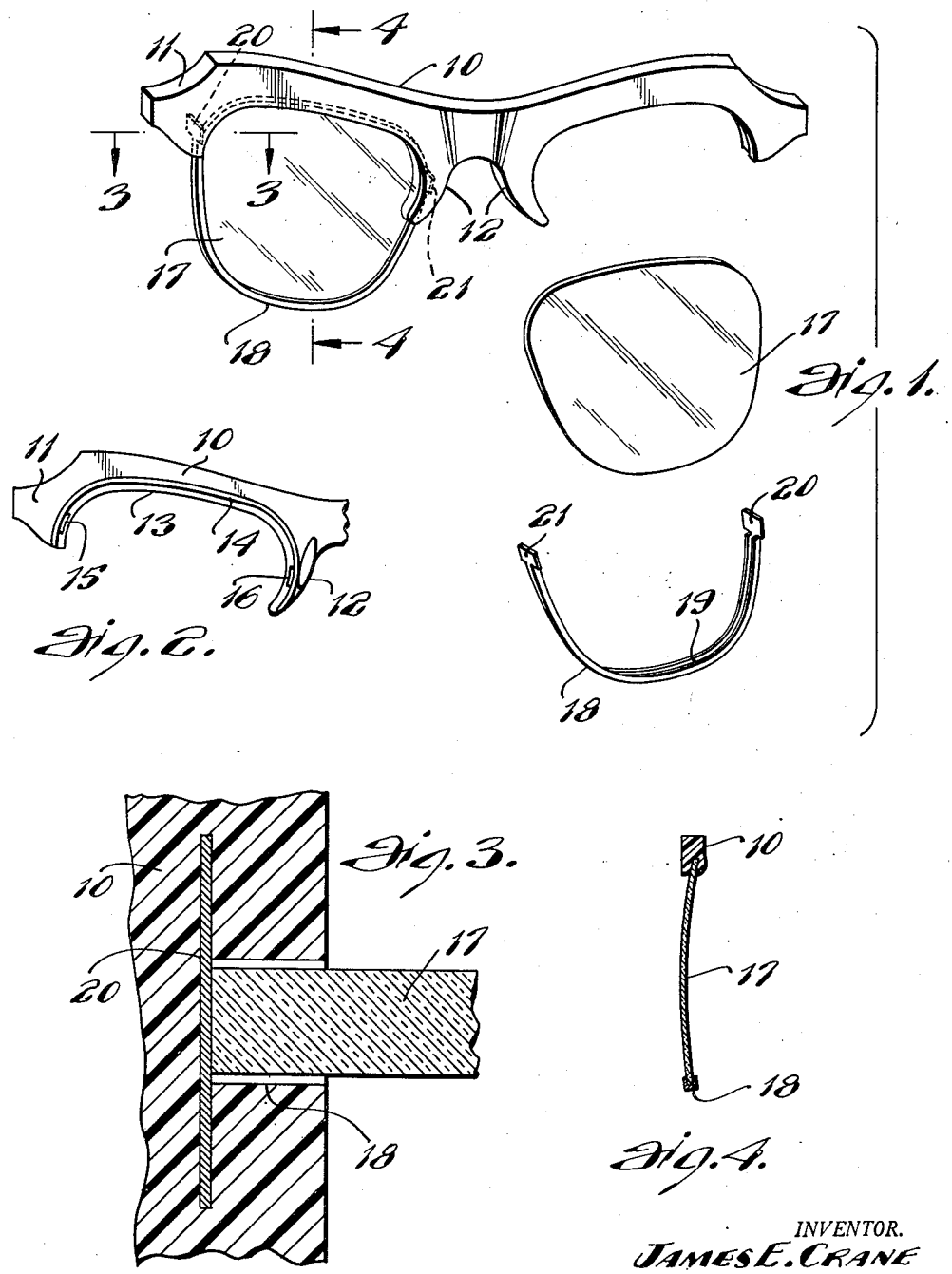

2,512,011

UNITED STATES PATENT OFFICE 2,512,011

OPHTHALMIC MOUNTING

James E. Crane, Leominster, Mass., assignor to Foster Grant Co., Inc., Leominster, Mass., a corporation of Massachusetts Application July 2, 1949, Serial No. 102,779

2 Claims. (Cl. 88—47)

This invention relates to ophthalmic mountings, more particularly to certain improvements in spectacles or sunglass frames made of two different materials.

One of the objects of the invention is to provide a lens mounting consisting of a molded plastic part and two metallic parts into which parts the lower edge portions of the lenses fit and by which the lenses are permanently secured to the plastic part.

Another object is to produce a frame of this character of simple design and sturdy construction.

Other objects and advantages of the invention will appear from the following description thereof, reference being had to the accompanying drawings, in which:

Figure 1 is a perspective view of a frame front embodying the invention, the parts being shown in assembled relation in the left hand side of the view and in exploded relation in the right hand side;

Fig. 2 is a fragmentary rear face view of the plastic frame portion before the lens and metallic part is secured thereto;

Fig. 3 is a horizontal cross-sectional view, on an enlarged scale, taken on the line 3—3 of Fig. 1; and Fig. 4 is a vertical cross-sectional view on the line 4—4 of Fig. 1.

The frame comprises an upper part 10 preferably made of molded plastic material, such as is commonly used in the manufacture of sunglass and spectacle frames, which part includes temple lugs 11 to which the temples (not shown) are suitably fastened, and a nose bridge portion 12.

As shown in Fig. 2, the rear surface of the member 10 is molded with a flat wall 13 and an upright wall 14, such as disclosed in Patent No. 2,132,106 of October 4, 1938 to Philip J. Graham. The frame is also formed with a recess or indentation 15 at its temple lug ends and similar recesses or indentations 16 at its bridge end. The purpose of these recesses will be hereinafter described. The opening formed by the walls 13 and 14 is shaped and conformed in size to receive the upper rim edge of the lens 17.

18 indicates a metallic member having a longitudinally extending interior channel 19 which is shaped to conform to the sides and lower edge portions of the lens 17, and serves to support the lens in the assembly. The upper end of the member 18 at the temple lug side is formed with a transverse portion or lug 20, and at its bridge end with a corresponding transverse lug 21.

In assembly each of the lenses is inserted in one of the metallic parts 18 and these are then applied to the frame member 10 with one of the protruding parts of the lug 20 inserted in the recess 15 and the corresponding part of lug 21 in the recess 16. The upright wall portion 14 is then rolled over upon the upper edge of the lenses 17 and over the other protruding portions of the lugs 20 and 21, which portions become embedded in the material of the wall 14, thus permanently and securely fastening the lens supporting metallic parts 18 to the frame part 10.

From the foregoing description it will be seen that the present invention provides a simple, efficient and inexpensive means of securing the metallic lens supporting parts to the plastic frame part and of retaining them permanently in fixed position thereto.

What I claim is:

1. In an ophthalmic mounting, a spectacle frame front comprising a one-piece molded plastic member having temple lugs at its outer ends, a nose-bridge in the middle, and intermediate portions in which the upper edge of each lens is received and held, said intermediate portions each having recesses adjacent the temple lug and the nose-bridge, respectively, and metallic members each having a longitudinal channel in which the lower edge and sides of each lens are supported, said metallic members each terminating at its ends in lugs having portions that protrude outwardly beyond both sides of the metallic members, each of said metallic members having one portion of each lug received in said recesses and having its other portion embedded in the material of the plastic member.

2. In an ophthalmic mounting, a spectacle frame front comprising a one-piece molded plastic member having temple lugs at its outer ends, a nose-bridge in the middle, and intermediate portions providing rims for the upper edge of the lenses, said portions having a relatively flat wall and a rolled over wall between which said edge of each lens is received and held, the flat wall of each of said portions having recesses formed therein adjacent the temple lug and the nose-bridge, respectively, and metallic members each having a longitudinal channel in which the lower edge and sides of each lens are supported, said metallic members each terminating at its ends in lugs having portions that protrude outwardly beyond both sides thereof, each of said metallic members having one portion of each lug received in the recesses of the flat wall of the plastic member and having its other portion embedded in the rolled over wall.

JAMES E. CRANE.

REFERENCES CITED

The following references are of record in the file of this patent:

UNITED STATES PATENTS

| Number | Name | Date |
|---|---|---|
| 2,329,100 | Chappell | Sept. 7, 1943 |